United States Patent
Doak

(10) Patent No.: US 6,176,444 B1
(45) Date of Patent: Jan. 23, 2001

(54) GLASS CONTAINER HAMMERMILL LIFTING DEVICE

(76) Inventor: Ron K. Doak, Box 216, Pearland, TX (US) 77588-0216

(*) Notice: Under 35 U.S.C. 154(b), the term of this patent shall be extended for 0 days.

(21) Appl. No.: 09/157,160

(22) Filed: Sep. 18, 1998

(51) Int. Cl.$^7$ .................................................. B02C 19/14
(52) U.S. Cl. ........................ 241/99; 241/101.78; 241/301
(58) Field of Search ......................... 241/37.5, 285.1, 241/285.2, 285.3, 99, 101.2, 100, 101.78, 301

(56) References Cited

U.S. PATENT DOCUMENTS

| | | | |
|---|---|---|---|
| 4,979,683 | * 12/1990 | Busdeker | 241/99 |
| 5,124,126 | * 6/1992 | Ripp | 241/99 |
| 5,620,146 | * 4/1997 | Lukas | 241/99 |
| 5,743,473 | * 4/1998 | Gregg | 241/99 |
| 5,833,151 | * 11/1998 | Doak | 241/99 |

* cited by examiner

Primary Examiner—Mark Rosenbaum
(74) Attorney, Agent, or Firm—Wendy K. Buskop; Buskop Law Group PC

(57) ABSTRACT

An apparatus and a method for lifting a glass container hammermill to enable a holding and storage receptacle to be placed beneath the hammermill is disclosed. The apparatus and the method may utilize a variety of lifting and locking mechanisms to lift and then lock the hammermill in the upper or release position so that the glass cullet holding and storage can be removed and replaced. Providing a user a mechanical means of lifting a hammermill high enough to place a storage receptacle below the break area allows for faster glass crushing and greater receptacle storage capacity.

4 Claims, 2 Drawing Sheets

GLASS CONTAINER HAMMERMILL LIFTING DEVICE

TECHNICAL FIELD

This invention is in the general field of a lifting device for an on-site glass receptacle hammermill that fits on top of a receptacle, for example, a 55-gallon drum.

BACKGROUND OF THE INVENTION

Glass bottle hammermills and/or grinders have usually been self-contained units that incorporated the grinding and/or crushing area along with a self-enclosed collection area for the receiving and storing of the glass cullets. The relevant art as shown in U.S. Pat. Nos. 5,350,120; 5,328,106; 5,310,122; 5,289,980; 5,226,606; 5,242,126; 5,215,265; 5,186,403; 5,184,781; and 5,150,844 bear this out. In addition, patent application Ser. No. 08/730,820, of which this patent application is an extension to, is also a completely self-contained hammermll crushing unit.

Previous inventions and all the prior art in this field have not addressed the configuration of a receptacle or drum top crusher or hammermill that incorporates any means for lifting the crushing or hammermill mechanism. Previous art shows that any receptacle or drum top hammermill requires manual lifting as the elevation means for placing the unit on top of the drum. In addition to the difficulty in lifting the weight of a crusher or hammermill to drum top height, there are some other problems such as having a safe and effective means to ensure that the unit will not operate unless there are safety devices in place and activated in an effective, economical and safe manner.

Thus, this invention addresses the problem of lifting the crusher or hammermill unit in an effective, economical and safe manner so the device as described in patent application Ser. No. 08/730,820 can be utilized in the capacity of a drum top hammermill and the drum receptacle is the collection, storage and transportation vessel.

SUMMARY OF THE INVENTION

Described herein is an apparatus and method for lifting a crusher or hammermill so as to place in on top of a collection, storage and transportation vessel such as a 55-gallon drum. A crusher or hammermill device can weigh upwards of 200 pounds. This makes the utilization of a receptacle or drum top hammermill device difficult for use in many areas, especially in areas where the users cannot lift in excess of 75 pounds without other mechanical assistance.

This apparatus is a spring balanced lift mechanism that comprises four pistons rods attached to a frame or lift carriage at the bottom comprising four wheels that can be locked into position for units that are determined to be necessary as transportable. If the unit is to be stationary, the wheels are not necessary as the unit would be permanently affixed to the floor. The upper frame is attached to the crusher or hammermill. The expansion springs are affixed on the piston rods between the lower frame and the upper frame by means of an enlarged cylindrical housing at the top of the piston rod within which the expansion spring is situated and attached. The expansion springs allow the user to move the crusher or hammermill device upward with minimal difficulty due to the device's weight. The piston rods have latch pin holes selectively located so latch pins on each enlarged cylindrical housings can be engaged by means of a release latch lever so that the hammermill device can be locked into an open, or at a height that would allow the 55-gallon receptacle to be inserted or removed, an operation height that would lock the hammermill onto the top of a 55-gallon receptacle for the safe operation of the device, and into a down or stored position where the hammermill device is situation near or on the upper flanges of the lower lift carriage frame.

Permanent handles are attached to the enlarged cylindrical housings to give the user the leverage required to lift, along with the mechanical advantage of the lift springs, when the hammermill device is being elevated to either insert or remove a receptacle (55-gallon drum) from the crushing area of the device.

The piston rod latch pins are attached by means of a fixed pivot with a front and rear latch pin assembled thereto so as when the latch lever is engaged, the front and rear latch pins are disengaged from the piston rod latch pin holes and the hammermill device can be lifted or lowered mechanically assisted by the expansion lift springs.

The dual cylindrical shapes of the flange areas below the hammermill break area is manufactured so as to allow the inner and outer flanges to fit within the opening of a 55-gallon drum receptacle. A electronic relay is situated within the two flanges so the top of the 55-gallon drum receptacle engages the electronic relay when the hammermill device is lowered onto the 55-gallon drum receptacle and the unit is properly in place and safe to operated.

BRIEF DESCRIPTION OF THE DRAWINGS

Drawing 1 is an overview of the hammermill section as described in patent application Ser. No. 08/730,820 further showing a wheeled lift carriage with the lift springs located on the piston rods attached to the hammermill section by means of an upper frame comprising latch pins and latch pin cables and a 55-gallon drum receptacle in place for collection and storage of glass cullets.

Drawing 2 is a detailed drawing showing the manufacture and arrangement of the latch pin assembly as it would appear when in position on top of a 55-gallon drum receptacle

DETAILED DESCRIPTION OF THE PREFERRED EMBODIMENT

Figure 1:
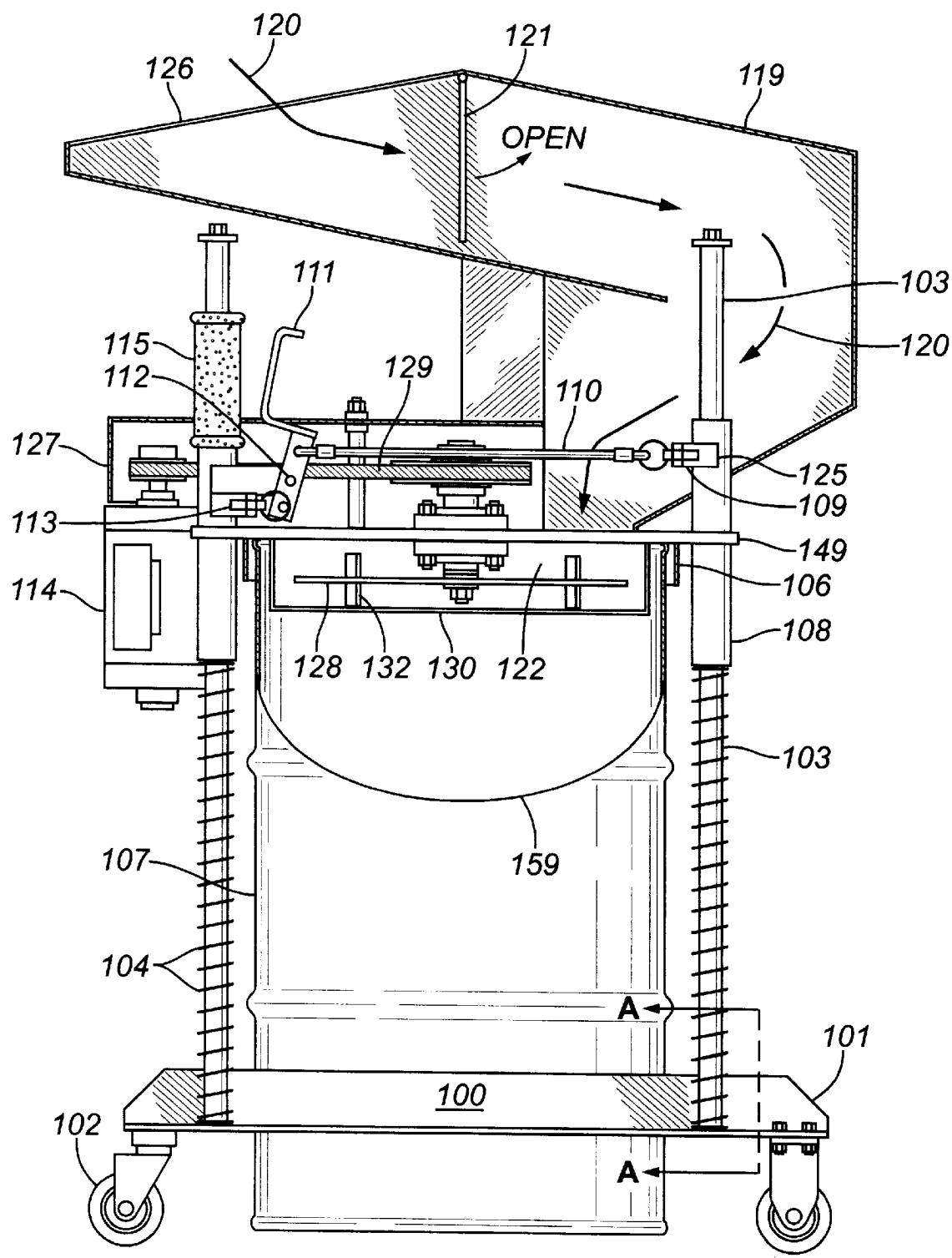
Figure 2:
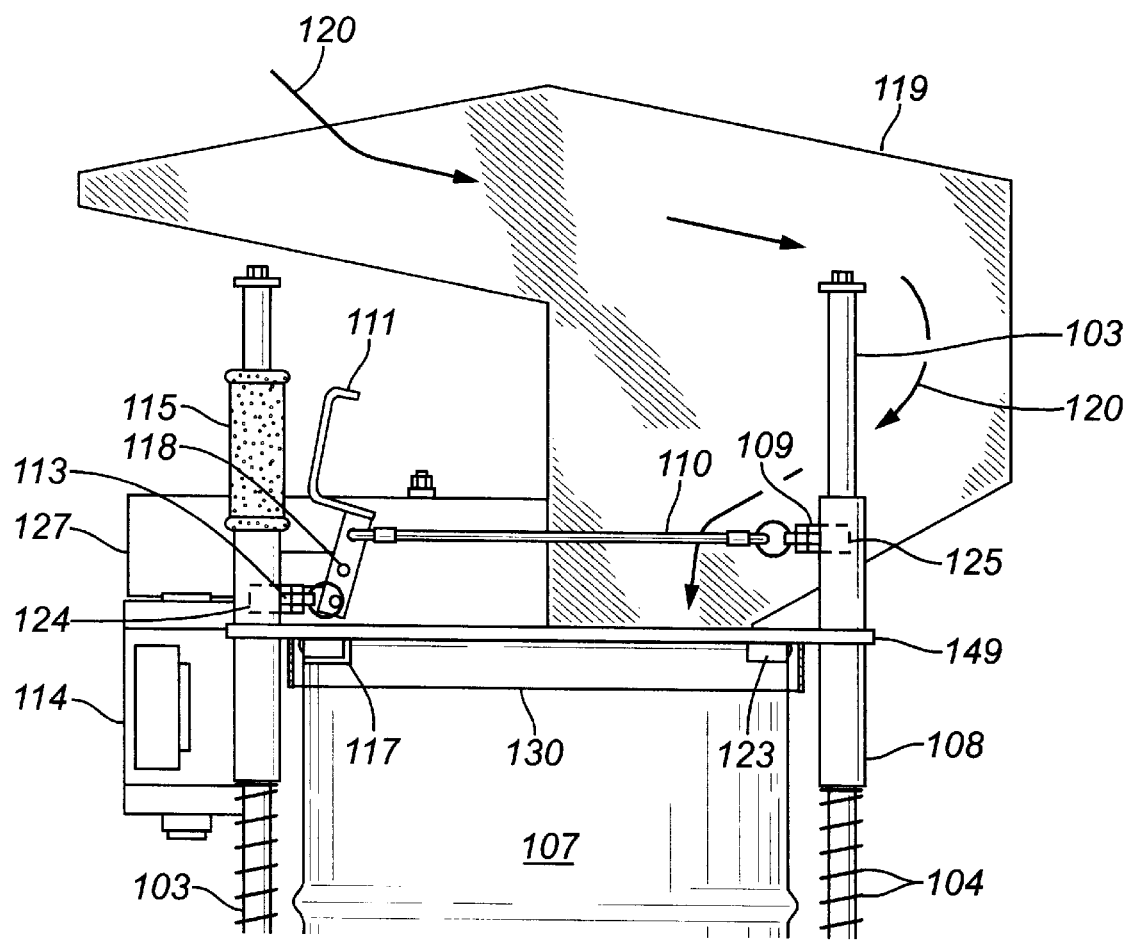

In detail and in which like numerals refer to like parts throughout, Drawing 1 depicts a hammermill apparatus 100 as described in patent application Ser. No. 08/730, 820 affixed to the top of a 55-gallon drum receptacle 107. The hammermill apparatus 100 is attached to an upper frame 119 by means of cylindrical housings 108 that are positioned around piston rods 103 that are attached to and extend from the wheeled 102 lower frame 101 and separated by means of expansion lift springs 104. The upper frame 119 with the hammermill device 100 can be elevated or lowered with the mechanical aid of the expansion lift springs 104 when a 55gallon receptacle 107 is to be placed under or removed from under the hammermill device 100.

The drawing also shows the bottle chute 149 through which the glass containers are inserted into the hammermill device 100. The bottle input path 120 allows the glass containers to pass past a safety flap door 121 down the chute 149 into the hammermill crush area 122, where the glass containers are impacted by hammermill blades 128. The hammermill blades are driven by motor 114 and belt drive 129. The motor 114 is secured behind belt drive 129. The bottles are impacted by both the hammermill blades 128 and the stators 132. The broken glass cullets then drop through orifices 130 and 159 into the 55-gallon receptacle 107 after being crushed into recyclable cullets.

Piston rods 103 are attached to expansion lift spings within and through the cylindrical housings 108 which are connected to upper frame 119 that holds the hammermill device 100. The expansion lift springs 104 are affixed within and attached to the cylindrical housings 108 so as to allow the upper frame 119 with the hammermill device 100 attached to be able to ascend and descend as desired by the user when placing a 55-gallon drum 107 or like receptacle under the hammermill device 100 so glass containers can be crushed. Cylindrical flanges 105 and 123 that extend vertically from the bottom of hammermill device 100 fit over the outside and the inside diameter edges of the 55-gallon drum 107 receptacle four to five inches so as to ensure the proper and safe seating on the drum 107 and electronic safety relays 117 are so positioned within the cylindrical flanges 105 and 123 so as to not allow the hammermill device 100 to operate unless the electronic safety relays 117 and 123 are properly engaged by means of pressure from the upper cyclindrical edge of drum 107.

Drawing 2 is detailed to show the manufacture of the latching assembly. Upper frame 119 with the hammermill device 100 attached can be raised or lowered on the piston rods 103 utilizing the mechanical aid of the expansion lift springs 104 by means of handles 115. The device can then be positioned into place by means of the front latch pin 113 and the rear latch pin 109 that would be inserted into latch pin holes 124 and 125 respectively in the piston rods 103 and latched or released as required. The front and rear latch pins 113 and 109 would be disengaged by means of a latch lever 111 that is positioned by means of a fixed pivot 118 and further by means of a rear pin pull cable 110. Predetermined latch pins 109 and 113, and receptacle holes 124 and 125 are strategically placed along the vertical axis of piston rods 103 so that the upper frame 119, and all the attachments are able to be locked in position to hold the hammermill assembly and all its components in vertical position.

While described herein in terms of preferred embodiments and methodologies with particularity, it will be obvious to those skilled in the art, however, that numerous additions, deletions, and modifications might well be made to the illustrated embodiments without departing from the spirit and scope of the invention as set forth in the claims such as substituting pneumatic or hydraulic lift capacity in place of the expansion lift springs herein described.

I claim:

1. An apparatus for lifting a crushing or hammermill device vertically to enable a user to be able to use mechanical means for raising a heavy bottle crushing or hammer mill to fit on top of a 55-gallon drum receptacle, said apparatus comprising:

(a) a wheeled lower frame that has attached four piston rods;

(b) expansion lift springs fitted on the outside diameter of each of the four piston rods and attached within four cylindrical housings;

(c) said housings attached to an upper frame so that the four cylindrical housings sit on the expansion springs and slide vertically on the four piston rods;

(d) an upper frame assembly that includes a bottle crushing or hammermill device;

(e) a latching pin assembly with front and rear latch pins; and (f) a latch lever mounted with a fixed pivot so as to enable engagement and disengagement of the latch pins from the piston rods by means of a pull cable.

2. An apparatus for lifting a crushing or hammermill device vertically as claimed in claim 1 and wherein said upper frame assembly can be locked into place by means of front and rear latch pins, said upper frame locking assembly comprising:

(a) the hammermill device attached to a floating upper frame;

(b) latch pin locking mechanisms that are attached to the floating upper frame via a fixed pivot so that front and rear latch pins can be engaged and disengaged by way of a pin pull cable;

(c) a front and rear latch pin pull cable attached to the front and rear latch pins; and (d) a fixed pivot point attachment that allows the front and rear latch pins to be engaged and disengaged by means of a latch lever attached thereto.

3. An apparatus as described in claim 2 wherein the floating upper frame has two separate cylindrical flanges one inch apart wherein one cylindrical flange fits on the outside diameter of the 55-gallon drum receptacle and the other cylindrical flange fits on the inside diameter of the 55-gallon receptacle and extend up to five inches from the top of the receptacle into the receptacle.

4. An apparatus as described in claim 3 and wherein electronic relay safety switches are mounted within the floating upper frame assembly between the cylindrical flanges that fit on the outside and inside diameters of the receptacle so as to make contact with the 55-gallon drum receptacle when the floating upper frame is lowered by the mechanical means of the expansion springs guided by the piston rods onto the top of the receptacle.

* * * * *